(12) United States Patent
Lewis et al.

(10) Patent No.: US 10,695,970 B2
(45) Date of Patent: Jun. 30, 2020

(54) MANUFACTURING METHOD AND APPARATUS

(71) Applicant: LENTUS COMPOSITES LIMITED, Banbury Oxfordshire (GB)

(72) Inventors: Paul Anthony Lewis, Enysham (GB); Simon William Odling, Eynsham (GB); Micahel James Dewhirst, Eynsham (GB)

(73) Assignee: LENTUS COMPOSITES LIMITED, Banbury, Oxfordshire (GB)

( * ) Notice: Subject to any disclaimer, the term of this patent is extended or adjusted under 35 U.S.C. 154(b) by 263 days.

(21) Appl. No.: 15/566,507

(22) PCT Filed: Apr. 14, 2016

(86) PCT No.: PCT/GB2016/051042
§ 371 (c)(1),
(2) Date: Oct. 13, 2017

(87) PCT Pub. No.: WO2016/166537
PCT Pub. Date: Oct. 20, 2016

(65) Prior Publication Data
US 2018/0099450 A1 Apr. 12, 2018

(30) Foreign Application Priority Data

Apr. 16, 2015 (GB) .................................. 1506480.1

(51) Int. Cl.
*B29C 53/60* (2006.01)
*B29C 53/80* (2006.01)
*B29C 53/62* (2006.01)

(52) U.S. Cl.
CPC .......... *B29C 53/8041* (2013.01); *B29C 53/62* (2013.01)

(58) Field of Classification Search
CPC ... B29C 53/8041; B29C 53/62; B29C 53/665; B29C 70/32; B65H 81/00
See application file for complete search history.

(56) References Cited

U.S. PATENT DOCUMENTS 5,257,748 A * 11/1993 Morizzo ................ B65H 18/20
242/527

FOREIGN PATENT DOCUMENTS

| CN | 205879318 U | * | 1/2017 | ............ G01G 17/02 |
| DE | 2439212 A1 | * | 2/1976 | ........... B65H 18/145 |

(Continued)

OTHER PUBLICATIONS

International Search Report for PCT/GB2016/051042, Completed by the European Patent Office dated Jun. 16, 2016, 3 Pages.

(Continued)

*Primary Examiner* — Emmanuel M Marcelo
(74) *Attorney, Agent, or Firm* — Brooks Kushman P.C.

(57) ABSTRACT

A method of manufacture of a product from a composite material is described, the method including winding a material onto a mandrel, monitoring the material, as it is wound onto the mandrel, to ascertain at least one dimension of the material being wound, and monitoring the mandrel as the material is wound thereon to ascertain the weight of the material being wound, and controlling the winding of the material onto the mandrel to take into account variations in the material being wound using the at least one dimension and the weight values derived during the monitoring. An apparatus suitable for use in the method is also described.

20 Claims, 1 Drawing Sheet

(56) References Cited

FOREIGN PATENT DOCUMENTS

| | | |
|---|---|---|
| EP | 1191253 | 3/2002 |
| EP | 2060383 | 5/2009 |
| GB | 2462941 | 3/2010 |
| JP | 2004209923 | 7/2004 |
| JP | 2009137102 | 6/2009 |
| WO | 2006074313 | 7/2006 |
| WO | 2011116191 | 9/2011 |

OTHER PUBLICATIONS

Great Britan Search Report for Application No. GB 1506480.1, Date of Search Oct. 8, 2015, 1 Page.

\* cited by examiner

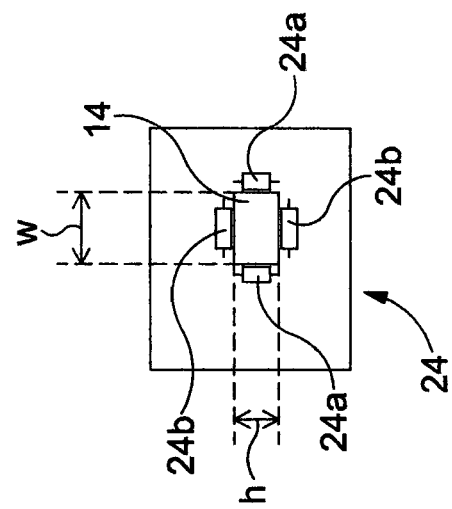
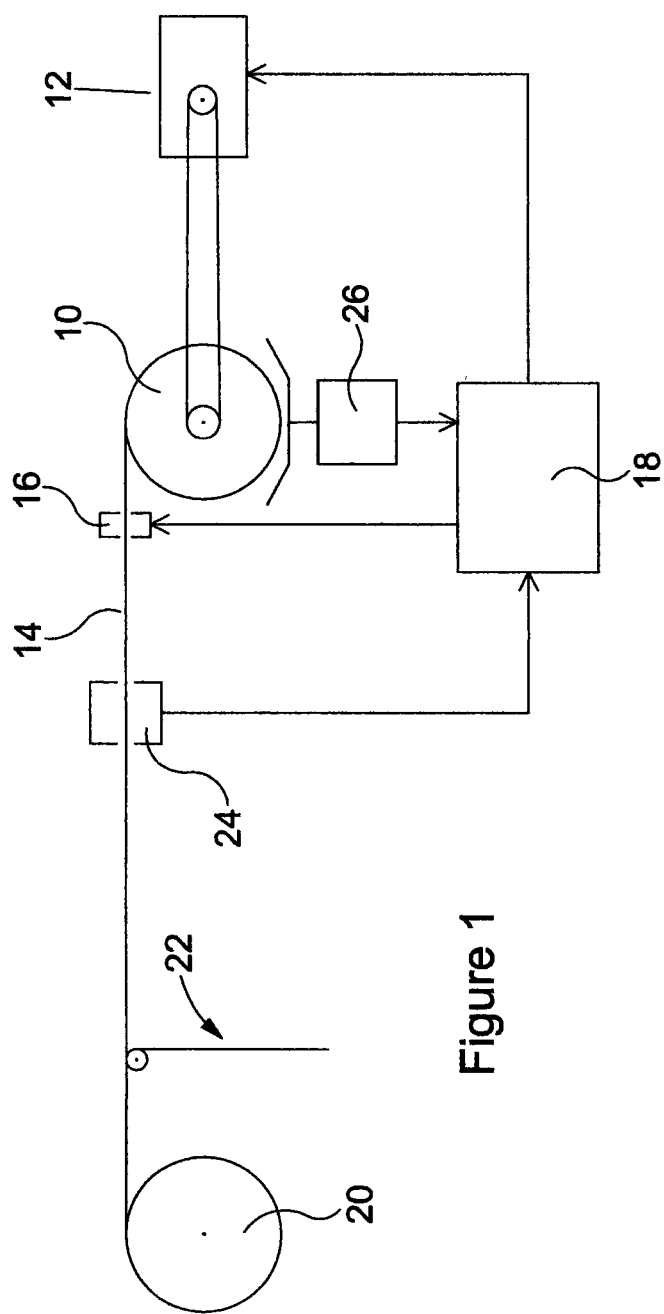
Figure 1
Figure 2

MANUFACTURING METHOD AND APPARATUS

CROSS-REFERENCE TO RELATED APPLICATION

This application is the U.S. national phase of PCT Application No. PCT/GB2016/051042 filed on Apr. 14, 2016, which claims priority to GB Patent Application No. 1506480.1 filed on Apr. 16, 2015, the disclosures of which are incorporated in their entirety by reference herein.

This invention relates to a method and apparatus for use in the manufacture of products, and in particular to a method and apparatus for use in the manufacture of products of composite material form in which a material is wound onto a former as part of the manufacturing process.

One technique by which composite material products are manufactured involves the winding of a fibre material, for example in the form of glass or carbon fibres, onto a mandrel, the fibre material being coated with a resin material, or having a resin material impregnated therein. Once the material has been wound onto the mandrel, the assembly is placed under conditions allowing the resin material to flow to fill voids between the fibre material, and subsequently to allow the resin material to cure. In other manufacturing methods, the resin material is applied to the fibre material after winding, and then allowed to cure.

The strength, stiffness and other properties of a product manufactured in this manner depend upon a number of factors including the ratio of reinforcing fibre material to resin material, the distribution of plies of the fibre material, fibre angles and the like. If the proportion of the final product made up of resin material is too high, then the product may be undesirably weak. If insufficient resin is present, then the reinforcing material fibres may not be sufficiently well bonded to one another. Depending upon the applications in which the product is to be used, the weight of the final product may also be key, and variations in the proportion of the product made up of resin material and the proportion made up of reinforcing fibre material can significantly alter the overall weight of the final product. Where a reinforcing fibre material impregnated with resin material is used in the manufacture of the product, then variations in the nature of the material can give rise to these problems. It is thought that material variances in materials used in the manufacture of composite material products, for example arising from variations in the dimensions of the material and the proportion of the reinforcing fibre material present in the material used in the manufacture of the product, can be high as +/-9%. The material variances may impact upon the ability to lay down the fibres in precisely the desired locations or at the desired orientations, and these variances can give rise to considerable variations in the stiffness or strength of the product, for example resulting in variations in the region of +1-20% in the stiffness of strength.

It is an object of the invention to provide a manufacturing method and apparatus in which the uniformity and consistency with which products can be manufactured can be enhanced.

According to the present invention there is provided a method of manufacture of a product from a composite material comprising winding a material comprising fibres and a resin material onto a mandrel, monitoring the material, before it is wound onto the mandrel, as it is wound onto the mandrel or once it is wound onto the mandrel, to ascertain at least one dimension of the material, and monitoring the weight of the material wound onto the mandrel, and controlling the winding of the material onto the mandrel to take into account variations in the material being wound using the at least one dimension and the weight values derived during the monitoring.

Conveniently, the step of monitoring the weight is achieved by monitoring the weight of the mandrel as the material is wound thereon. However, this need not always be the case and the weight of the material may be ascertained at other points in the process.

The material may take the form of a so-called pre-preg material in which a resin material is pre-impregnated into the fibres. Alternatively, the material may comprises fibres that are passed through a resin bath or the like for wet winding onto the mandrel.

Preferably, the monitoring the at least one dimension permits derivation of a cross-sectional area of the material being wound.

It will be appreciated that if the cross sectional area of the material being wound is known, and the weight of the material added to the mandrel is known, then the proportion of the material consisting of the reinforcing fibre material and the proportion of the material consisting of the resin material can be derived. If the weight or quantity of the reinforcing fibre material is lower than anticipated, then the winding operation may be controlled to increase the winding density or add additional windings to raise the weight of fibres present in the product to a desired level. If it is higher than anticipated then the winding density can be reduced, or layers could be omitted.

Whilst, conveniently, the monitoring of at least one dimension of the material allows the cross-sectional area thereof to be derived, there may be circumstances in which sufficient information can be derived by measuring only, for example, the width of the material. The at least one dimension may be monitored using any suitable device. By way of example, optical, laser-based, Eddy current based, air-gauge based or ultrasound based techniques could be used in the monitoring of the at least one dimension. Alternatively, a contact-based mechanism may be used. Preferably, the monitoring of the at least one dimension is undertaken continuously during winding. However, this need not always be the case and arrangements in which the at least one dimension is measured periodically are also possible.

The monitoring of the weight of the mandrel during winding may be a continuous process. Alternatively, winding may be interrupted periodically and the weight of mandrel and material wound thereon ascertained. By way of example, winding may be interrupted after every predetermined number of windings of material onto the mandrel, say after every 50 windings, or after completion of a layer of windings onto the mandrel.

The manner in which the winding is controlled conveniently involves using the at least one dimension and weight data and a suitable look-up table to ascertain how the winding should be modified to correct for material variations.

The invention further relates to a manufacturing apparatus for use in the manufacture of a product from a composite material comprising a fibre material and a resin material, the apparatus comprising a mandrel onto which the material is wound, in use, dimension monitoring means adapted to monitor the material as it is wound onto the mandrel, in use, to ascertain at least one dimension of the material being wound, weight monitoring means adapted to monitor the mandrel as the material is wound thereon to ascertain the weight of the material being wound, and control means controlling the winding of the material onto the mandrel using the outputs of the dimension monitoring means and the weight monitoring means to take into account variations in the material being wound.

The invention will further be described, by way of example, with reference to the accompanying drawings, in which:

FIG. 1 is a diagrammatic illustration of an apparatus for use in the manufacture of a composite material product in accordance with an embodiment of the invention, and employing the method of an embodiment of the invention; and FIG. 2 is another diagrammatic illustration showing part of the apparatus of FIG. 1.

Referring to FIG. 1, an apparatus for use in the manufacture of a composite material product is illustrated. The apparatus comprises a mandrel 10 rotatable by a drive arrangement 12 to wind a material 14 onto the surface of the mandrel 10. A guide arrangement 16 is provided operable, in conjunction with the rotation of the mandrel 10, to guide the material 14 so that the winding of the material 14 onto the mandrel 10 follows a desired pattern. The rotation of the mandrel 10 by the drive arrangement 12 and the operation of the guide arrangement 16 are controlled by a control unit 18, the operation of which controls the winding pattern, and hence density, with which the material 14 is wound onto the mandrel 10.

The material 14 is stored, prior to winding onto the mandrel 10, on a spool 20, the operation of driving the mandrel 10 for rotation serving to withdraw the material 14 from the spool 20.

The material 14 may take a range of forms. In this example, it comprises a combination of a reinforcing fibre material, for example of glass fibre or carbon fibre form, impregnated with a resin material. The material 14 is of substantially rectangular cross-sectional shape, and thus has a width dimension w and a height dimension h (see FIG. 2). It is supplied on a backing sheet 22 which is removed from the material 14 after withdrawal from the spool 20 and before reaching the mandrel 10.

In accordance with the invention, a dimension monitoring means 24 is provided and is operable to measure a dimension of the material 14 that is being wound onto the mandrel 10. In this case, the dimension monitoring means 24 is operable to measure both the width dimension w and the height dimension h. Preferably, the dimension monitoring means 24 is positioned so as to measure the dimensions of the material 14 after the backing sheet 22 has been removed therefrom in order to avoid any errors arising from variations in the thickness of the backing sheet 22 impacting upon the operation of the invention. However, if the backing sheet 22 is of good uniformity, then there may be instances in which the dimension monitoring means 24 could be arranged to monitor the dimensions of the material 14 before removal of the backing sheet 22 therefrom.

The manner in which the dimension monitoring means 24 operates to monitor the dimension or dimensions of the material 14 is not critical to the operation of the invention. It will be appreciated that it may take a wide range of forms. By way of example, it may take the form of a mechanical arrangement including members 24a, 24b, for example in the form of rollers biased into engagement with surfaces of the material 14, the spacing of the members 24a, 24b being variable to maintain contact with the surfaces of the material 14, the positions of the members 24a, 24b being known and the spacing thereof providing an indication of the dimensions of the material 14.

Whilst the use of a mechanical arrangement of the form outlined above and in which direct contact occurs between the dimension monitoring means 24 and the material 14 is one way of monitoring the dimensions of the material 14, it will be appreciated that other techniques may be used. For example, optical measurement techniques may be used. Alternatively, laser-based techniques, Eddy current based techniques, air-gauge based techniques or ultrasound based techniques could be used. These are merely examples of the types of arrangement that may be used to monitoring the dimensions of the material 14, and it will be appreciated that this is a non-exhaustive list and that other techniques may be used without departing from the scope of the invention.

In addition to monitoring the dimensions of the material 14, the apparatus further comprises a weight monitoring means 26 operable to allow the weight of the material 14 wound upon the mandrel 10 to be monitored. Conveniently this is achieved by periodically interrupting the winding process detaching the mandrel 10 from the drive arrangement 12 and weighing the mandrel 10 together with the material 14 wound thereon. By way of example, the winding process may be interrupted after every, say 50 windings have been laid down upon the mandrel 10, and a weight measurement taken. Alternatively, the mandrel 10 and material 14 wound thereon may be weighed upon the completion of the winding of each layer of material 14 onto the mandrel 10.

Whilst one technique for monitoring the weight of the material 14 added to the mandrel 10 involves periodically interrupting winding to allow the mandrel 10 and material 14 wound thereon to be weighed, arrangements may be possible within the scope of the invention in which the mandrel 10 and material 14 wound thereon are continuously weighed.

The outputs from the dimension monitoring means 24 and the weight monitoring means 26 are supplied to the control unit 18 and are used by the control unit 18 in controlling the operation of the guide arrangement 16, and hence in controlling the subsequent winding of the material 14 onto the mandrel 10 to ensure that the weight of the fibre material within the final product substantially matches a desired level.

In one arrangement, the width dimension w and height dimension h derived using the dimension monitoring means 24 are used to calculate a cross-sectional area value for the material 14 being wound upon the mandrel 10. The cross-sectional area value is used, in conjunction with the output of the weight monitoring means 26 to ascertain a value for the weight of reinforcing fibres contained within the material 14 that have been wound upon the mandrel 10. The value of the weight of reinforcing fibres is conveniently derived using an appropriate look-up table. The look-up table may be populated using the results of tests, or may be derived mathematically using appropriate formulae. However, this need not always be the case, and arrangements are possible in which the value for the weight of reinforcing fibres is calculated from the dimensional information and weight information derived by the dimension and weight monitoring means 24, 26. The value of the weight of reinforcing fibres added to the mandrel 10 is compared to a desired weight value, and the outcome of the comparison is used in the control of the guide arrangement 16. By way of example, if it is determined that the weight of reinforcing fibres applied to the mandrel is lower than the desired level, the guide arrangement 16 may be controlled in such a manner that a subsequent layer of material 14 wound onto the mandrel 10 is wound with a greater winding density. If, on the other hand, it is determined that a higher than desired weight of fibres has been applied, the winding density of the subsequent layer may be reduced.

It will be appreciated that by using the apparatus described hereinbefore, and by using the methodology described hereinbefore, manufacturing consistency can be enhanced despite the presence of variations in the dimensions and content of the materials used in the manufacturing process. As mentioned hereinbefore, the typical material variance is in the region of +/−9%. Despite this, it is thought that material variability in the finished product may be reduced to +/−3.5%. Where products are required to be of at least a certain weight, using traditional methods a number of the products would have been significantly over the minimum required weight in order to ensure that the minimum required weight level is achieved when the material used is at the lower extreme of its variance range. By using the method and apparatus of the invention, it will be appreciated that these variations can be significantly reduced, and that significant material savings can be made as a result. Similarly, where a product is required to have a particular strength or stiffness, controlling of the winding of the fibre in the manner of the invention may allow improved consistency of manufacture of products having substantially the desired characteristics.

The invention is thought to be particularly beneficial when it is required to manufacture thin parts or hollow, tubular parts with a relatively thick wall section compared to the inner diameter thereof.

Although in the description hereinbefore reference is made to changing the winding density of the subsequent layer of material 14 in response to the dimension and weight information, depending upon the nature of the product being manufactured it may be preferred to defer varying the winding density until a point is reached at which the presence of one or more layers of increased or reduced winding density will not significantly negatively impact upon the properties of the product. In a tubular product, the outermost few layers are normally most critical to the strength of the part. Accordingly, where it is desired for the product to be of a certain weight, the winding process may be controlled in the manner set out hereinbefore to achieve a product of the desired weight so that by the time the final few layers are wound, which ensure that the required strength is achieved, the weight requirements will have been met.

If the product design requires a mesh to be applied at a particular radius, the use of the invention can allow accurate control over the positioning or formation of the mesh.

The methodology outlined hereinbefore may be used in the manufacture of a wide range of products. One product that may be manufactured using the method is a transmission shaft, the method allowing accurate control over the inner and outer dimensions of the shaft whilst ensuring that the shaft is of a desired weight and volume fraction of fibre, and allowing the product strength and stiffness requirements to be met.

After winding, curing of the resin and other manufacturing steps are performed in substantially the usual manner to complete the manufacture of the product.

Whilst the description hereinbefore relates primarily to the use of so-called pre-preg materials in which the resin is pre-impregnated into the fibre material, the invention is not restricted in this regard and is also applicable to, for example, arrangements in which the fibre is passed through a resin bath or the like for subsequent wet winding onto the mandrel. Where the material is wet wound onto the mandrel, the control arrangement could, if desired, be operable to vary the wetting out of the material in response to variations in the dimensions or weight of the material being wound.

Although a specific method and apparatus have been described hereinbefore, it will be appreciated that a wide range of modifications and alterations may be made thereto without departing from the scope of the invention as defined by the appended claims.

The invention claimed is:

1. A method of manufacture of a product from a composite material comprising winding a material comprising fibres and a resin material onto a mandrel, monitoring the material, before it is wound onto the mandrel, as it is wound onto the mandrel or once it is wound onto the mandrel, to ascertain at least one dimension of the material, and monitoring the weight of the material wound onto the mandrel, and controlling the winding of the material onto the mandrel to take into account variations in the material being wound using the at least one dimension and the weight value derived during the monitoring, wherein the monitoring the at least one dimension permits derivation of a cross-sectional area of the material being wound.

2. A method according to claim 1, wherein the at least one dimension and the weight are used to determine a value for the material fibre content.

3. A method according to claim 2, wherein the controlling step uses the determined fibre content value and adjusts the winding of the material onto the mandrel to maintain a fibre density of the material wound onto the mandrel at substantially a desired level.

4. A method according to claim 1, wherein the monitoring the at least one dimension of the material comprises monitoring a single dimension of the material from which a cross-sectional area can be derived.

5. A method according to claim 1, wherein the monitoring the at least one dimension is achieved using a dimension monitor that contacts the material.

6. A method according to claim 1, wherein the monitoring of the at least one dimension is undertaken continuously during winding.

7. A method according to claim 1, wherein the monitoring of the at least one dimension is undertaken periodically.

8. A method according to claim 1, wherein the monitoring of the weight during winding is a continuous process.

9. A method according to claim 1, wherein the monitoring of the weight is undertaken periodically.

10. A method according to claim 9, wherein winding is interrupted periodically and the weight of mandrel and material wound thereon ascertained whilst the winding is interrupted.

11. A method according to claim 1, wherein the manner in which the winding is controlled involves using the at least one dimension and weight data and a suitable look-up table to ascertain how the winding should be modified to correct for material variations.

12. A method of manufacture of a product from a composite material comprising;
   winding a material comprising fibres and a resin material onto a mandrel,
   monitoring the material, before it is wound onto the mandrel, as it is wound onto the mandrel or once it is wound onto the mandrel, to ascertain at least one dimension of the material,
   monitoring the weight of the material wound onto the mandrel, and
   controlling the winding of the material onto the mandrel to take into account variations in the material being wound using the at least one dimension and the weight value derived during the monitoring wherein the monitoring the at least one dimension is achieved using a dimension monitor that does not contact the material.

13. A method according to claim 12, wherein the dimension monitor is an optical-based, laser-based, Eddy current based, air-gauge based or ultrasound based monitor.

14. A method according to claim 12, wherein the at least one dimension and the weight are used to determine a value for the material fibre content.

15. A method according to claim 12, wherein the controlling step uses the determined fibre content value and adjusts the winding of the material onto the mandrel to maintain a fibre density of the material wound onto the mandrel at substantially a desired level.

16. A method according to claim 12, wherein the monitoring of the at least one dimension is undertaken continuously during winding.

17. A method according to claim 12, wherein the monitoring of the at least one dimension is undertaken periodically.

18. A method according to claim 12, wherein the monitoring of the weight during winding is a continuous process.

19. A method according to claim 12, wherein the monitoring of the weight is undertaken periodically and the weight of mandrel and material wound thereon ascertained whilst the winding is interrupted.

20. A manufacturing apparatus for use in the manufacture of a composite product from a composite material, the apparatus comprising comprising:

a mandrel onto which a material is wound, a guide for the material as it is being wound, a dimension monitor adapted to monitor the material before it is wound, as it is wound, or once it is wound onto the mandrel, to ascertain at least one dimension of the material permitting derivation of a cross-sectional area of the material being wound, a weight monitor adapted to monitor the material being wound onto the mandrel to ascertain the weight of the material being wound, and a controller cooperating with the guide for controlling the winding pattern of the material being wound onto the mandrel using the outputs of the dimension monitor and the weight monitor to take into account variations in the material being wound.

* * * * *